United States Patent [19]

Ahlbeck

[11] 4,341,562

[45] Jul. 27, 1982

[54] LIGHTWEIGHT AGGREGATE

[75] Inventor: Richard A. Ahlbeck, Toledo, Ohio

[73] Assignee: N-Viro Energy Systems, Ltd., Toledo, Ohio

[21] Appl. No.: 132,660

[22] Filed: Mar. 21, 1980

[51] Int. Cl.$^3$ .............................................. C04B 7/02
[52] U.S. Cl. ................... 106/97; 106/DIG. 1
[58] Field of Search ............... 106/97, 100, 103, 118, 106/120, DIG. 1

[56] References Cited

U.S. PATENT DOCUMENTS

| | | | |
|---|---|---|---|
| 2,687,290 | 8/1954 | Garoutte et al. | 106/100 |
| 2,871,133 | 1/1959 | Palonen et al. | 106/100 |
| 4,001,030 | 1/1977 | Watson et al. | 106/103 |
| 4,018,617 | 4/1977 | Nicholson | 106/DIG. 1 |
| 4,161,411 | 7/1979 | Sell et al. | 106/103 |
| 4,173,487 | 11/1979 | Cohen | 106/103 |

*Primary Examiner*—James Poer
*Attorney, Agent, or Firm*—Barnes, Kisselle, Raisch & Choate

[57] ABSTRACT

A lightweight aggregate of low energy requirements for use in making lightweight concrete comprising cement kiln dust pellets or cement kiln dust and fly ash pellets which have been cured at low temperature and high humidity.

2 Claims, No Drawings

LIGHTWEIGHT AGGREGATE

This invention relates to lightweight aggregate of low energy requirements that is particularly useful for making lightweight concrete.

BACKGROUND AND SUMMARY OF THE INVENTION

In making lightweight concrete, an important constituent is lightweight aggregate. The most commonly used lightweight aggregate comprises expanded clay, slag or shale for primary use in structural concrete and expanded perlite or vermiculite for primary use in insulating concrete. Mixtures of the two general types of aggregates are sometimes used to obtain a desired strength, bulk density of thermal conductivity. Standards have been established for lightweight aggregate for structural concrete ASTM Specification C 330-64T and for insulating concrete ASTM Specification C 332.

At the present time, the cost of lightweight aggregate is quite high and makes lightweight concrete more costly than conventional concrete.

Accordingly, among the objects of the present invention are to provide a lightweight aggregate utilizing waste materials that can be converted to a form useful for concrete with a minimum expenditure of energy and labor.

Basically, the invention comprises pelletizing cement kiln dust or a mixture of cement kiln dust and fly ash, both of which are waste products, thus with a zero energy cost and subjecting them to a moderate or ambient heat treatment, requiring much less energy than normally required to produce lightweight aggregate, and at high to 100% relative humidity to produce a lightweight aggregate that is useful for making concrete. When used to make lightweight concrete, the resultant concrete product comprises a plurality of pellets interspersed throughout the concrete wherein the pellets are not only physically embedded in the concrete but, in addition, are bonded to the cement through an interaction between the cement and the surface zones of the pellets.

It has heretofore been suggested that a lightweight aggregate might be made by pelletizing fly ash alone and subjecting the fly ash to a sintering. However, such a process now requires substantial additional energy in the sintering. Paper titled "Fly Ash Pelletizing" presented at Annual AIME Meeting, Feb. 27-Mar. 6, 1966, by Donald C. Violetta and Carl J. Nelson.

In England, lightweight aggregate is currently produced from fly ash by pelletizing the dust in a pan pelletizer and then sintering the pellets in a traveling grate furnace. Residual carbon in the ash provides part of the fuel required. The product has a bulk density of 50 to 60 pcf and is used for structural concrete. Reference Rock Products, June, 1975, pp. 69-70, 75.

The levels of carbon found in fly ash nationally in the USA have been dropping significantly in recent years as a direct result of efforts to improve combustion efficiency in thermal power plant systems burning coal, thus saving energy.

It has also heretofore been suggested that cement kiln dust be formed into large briquettes or pellets by compression for recycling in the cement kiln. Article from *Ind. Eng. Chem. Process Des. Dev.*, Vol. 17, No. 4, 1978, pages 468-472. However, I am not aware of any formation of pellets in accordance with the invention or their use in lightweight concrete.

The solid waste generated by cement manufacture is primarily kiln dust. This dust contains a mixture of raw kiln feed, partly calcined material, finely divided cement clinker and alkali sulfates (usually sulfates). There is economic value in returning the dust to the kiln, but when the alkali content of the returned dust is too high for the product clinker to meet specifications, the dust must be discarded. Up to about 15% of the raw materials processed may be collected as dust and of this about half may be low enough to alkalis to be returned to the kiln. The rest is usually stockpiled as a waste material which must be disposed and may be a nuisance and possibly a hazard.

Based on measurements made on a variety of cement kiln dusts that are usually disposed, well over 90% by weight of the dust will pass through a 325 mesh Tyler screen.

Weight average particle diameter is most often of the order of 10 microns.

Although the chemical reactions occurring in the resultant cement kiln dust are not well known, typical cement kiln dust has a chemical analysis as follows:

$SiO_2$
$Al_2O_3$
$Fe_2O_3$
CaO
MgO
$SO_3$
$Na_2O$
$K_2O$
Loss Ignition

More specifically, typical cement kiln dust may have the following analyses by weight:

| Kiln Dust Sample | $SiO_2$ | $Al_2O_3$ | $Fe_2O_3$ | CaO | MgO | $SO_3$ | $Na_2O$ | $K_2O$ | Ign. Loss |
|---|---|---|---|---|---|---|---|---|---|
| 1 | 13.30 | 3.75 | 1.57 | 36.85 | 1.26 | 7.97 | 0.44 | 9.08 | 26.38 |
| 2 | 14.00 | 4.45 | 1.61 | 41.56 | 2.74 | 5.16 | 2.06 | 4.22 | 25.48 |
| 3 | 15.32 | 2.67 | 3.39 | 42.07 | 1.01 | 2.76 | 1.01 | 6.03 | 27.08 |
| 4 | 16.08 | 5.36 | 2.22 | 39.66 | 2.29 | 0.27 | 0.17 | 1.51 | 7.14 |
| 5 | 14.66 | 3.88 | 1.37 | 47.98 | 0.54 | 4.42 | 3.61 | 3.62 | 21.06 |
| 6 | 10.92 | 3.87 | 1.49 | 36.95 | 1.46 | 8.74 | 0.36 | 14.34 | 21.42 |
| 7 | 11.20 | 3.20 | 1.40 | 48.80 | 2.10 | 2.40 | 0.20 | 4.20 | 26.60 |
| 8 | 13.86 | 3.91 | 1.69 | 42.87 | 1.44 | 8.53 | 1.82 | 4.58 | 20.08 |
| 9 | 13.00 | 4.00 | 5.00 | 47.20 | 1.20 | 13.60 | 0.45 | 2.90 | 12.90 |
| 10 | 17.12 | 6.26 | 2.18 | 49.09 | 1.12 | 3.26 | 2.43 | 3.92 | 17.10 |
| 11 | 15.66 | 5.18 | 2.34 | 40.30 | 2.11 | 6.30 | 1.54 | 8.44 | 19.40 |
| 12 | 16.95 | 5.14 | 2.18 | 40.30 | 1.16 | 7.37 | 3.64 | 18.08 | 21.98 |
| 13 | 11.00 | 4.08 | 2.02 | 40.66 | 0.54 | 9.33 | 1.48 | 9.08 | 20.22 |
| 14 | 16.34 | 4.36 | 2.18 | 46.95 | 0.58 | 3.74 | 3.92 | 3.77 | 21.12 |
| 15 | 14.20 | 4.88 | 2.58 | 42.19 | 0.85 | 7.23 | 1.54 | 7.53 | 20.04 |

-continued

| Kiln Dust Sample | SiO$_2$ | Al$_2$O$_3$ | Fe$_2$O$_3$ | CaO | MgO | SO$_3$ | Na$_2$O | K$_2$O | Ign. Loss |
|---|---|---|---|---|---|---|---|---|---|
| 16 | 14.48 | 5.00 | 2.02 | 52.61 | 0.90 | 2.74 | 1.21 | 1.72 | 21.05 |
| 17 | 16.70 | 4.44 | 2.02 | 47.10 | 1.82 | 1.82 | 0.10 | 2.11 | 24.67 |

| | Range of Specific Elements (as Oxides) | |
|---|---|---|
| | Low % | High % |
| SiO$_2$ | 10.92 | 17.12 |
| Al$_2$O$_3$ | 2.67 | 6.26 |
| Fe$_2$O$_3$ | 1.37 | 3.39 |
| CaO | 36.85 | 52.61 |
| MgO | 0.54 | 2.74 |
| SO$_3$ | 0.27 | 13.60 |
| Na$_2$O | 0.10 | 3.92 |
| K$_2$O | 1.51 | 18.08 |
| Ignition Loss | 7.14 | 27.08 |

When mixtures made in accordance with the invention and mixed with water to produce a pozzolanic reaction have been tested in accordance with the specifications given in ASTM C-593 for fly ash and other pozzolans for use with lime, it has been found that the compositions meet or exceed the specifications.

The term "fly ash" as used in connection with stabilized bases is well known and as used herein is intended to indicate the finely divided ash residue produced by the combustion of pulverized coal or lignite, which ash is carried off with the gases exhausted from the furnace in which the coal is burned and which is collected from these gases usually by means of suitable precipitation apparatus such as electrical precipitators. Those finely pulverized ashes resulting from combustion of oil and from combustion of waste materials in a large incinerator or natural pozzolans can also be utilized in the methods described herein providing their chemical compositions are reasonably similar to pulverized coal fly ashes. The fly ash so obtained is in a finely divided state such that usually at least 70% by weight passes through a 200-mesh sieve, although incinerator ashes may be considerably coarser. Such fly ash may be considered an "artificial pozzolan", as distinguished from a "natural pozzolan". Typical pozzolanic fly ashes comprise those known as western fly ash, sub-bituminous fly ash and lignitic fly ash.

In accordance with the invention, cement kiln dust from the cement kiln, alone or in a mixture with fly ash is pelletized preferably in a shallow pan pelletizer of well-known construction to produce pellets ranging in size from about 60 mesh Tyler sieve series to over $\frac{3}{4}$-inch diameter. Shallow pan (disc) pelletizers are normally preferred for producing fine pellets, while deep drum pelletizers are preferred for making large pellets. For concrete applications, a wide range of particle sizes proportioned in a smooth grading is desirable for optimum workability and strength. Although pelletizers typically produce pellets of a relatively narrow size range at any set of process parameters, a range of pellet sizes can be made by varying the process parameters (particularly water content and feed location) to produce a desired size range. Pellets with different size ranges can then be blended together to produce a wide size range if desired.

Further, in accordance with the invention, small amounts of additives may be added to enhance the physical properties or the handling properties. For example, small amounts up to 10% of additives to increase the strength or rate of increase could be used such as portland cement, quick lime, free lime from any source, or water soluble salts such as sulfates, carbonates and hydroxides of sodium and potassium and mixtures thereof such as alkali metal, alkaline earth metal sulfate and acid sulfate such as sodium, potassium and magnesium sulfate. In addition, small amounts of additives such as water reducers, other wetting agents commonly utilized in concrete-making may be used which reduces the amount of water necessary to achieve strength development.

The resultant pellets are then subjected to a low temperature hydrothermal treatment resulting in a lightweight aggregate that has sufficient strength to serve for use in making concrete.

More specifically, the pellets are subjected to heat and high relative humidity which includes 100%. Those skilled in the arts can device various low cost methods for controlling both temperature and humidity of large volume of pellets.

It has been found that water utilized during the pelletizing should be approximately 20 to 35 percent (based on dry material weight) for kiln dust alone or for mixtures of cement kiln dust and fly ash. However, the water content will vary with the characteristics of the particular cement kiln or fly ash dusts being used, and may be higher or lower than the desirable range identified above for cement kiln dust alone or for mixtures of cement kiln dust and fly ash.

EXAMPLE I

In a typical example, cement kiln dust was pelletized alone in a shallow pan pelletizer, the cement kiln dust having the following composition by weight:

| | |
|---|---|
| SiO$_2$ | 13.2 |
| Al$_2$O$_3$ | 2.8 |
| Fe$_2$O$_3$ | 2.23 |
| CaO (total) | 45.0 |
| MgO | 1.8 |
| SO$_3$ | 7.57 |
| K$_2$O | 7.0 |
| Na$_2$O | 0.16 |
| Loss on Ignition | 19.90 |
| Free CaO | 12.39 |

The pelletizer speed (clockwise rotation) and angle were adjusted to give a bed of dry powder cascading down from about the 9 o'clock position. A water spray was directed onto the material at the 9 o'clock location and dry material was simultaneously added to the pan at the 3 o'clock position at a rate such that the water content would be 36.3 percent under steady state conditions. As the dry powder became wetter, pellets began to form and several gallons were collected before an overly wet condition caused the pelletizer to be shut down. The pellets produced had a relatively wide size distribution as shown in Table 2.

TABLE 2

| SIEVE ANALYSIS AND BULK DENSITY OF PELLETS PRODUCED | | | | |
| --- | --- | --- | --- | --- |
|  | Example I | Example II | Example III | Example IV |
|  | Sieve Analyses, weight percent | | | |
| Tyler Mesh |  |  |  |  |
| +4 | 9.3 | 33.6 | — | 56.1 |
| 4/6 | 20.4 | 52.0 | 44.6 | 16.7 |
| 6/8 | 30.3 | 7.4 | 50.3 | 10.2 |
| 8/10 | 26.9 | 2.4 | 1.9 | 5.8 |
| 10/14 | 8.4 | 0.9 | 0.4 | 3.7 |
| −14 | 5.0 | 3.5 | 2.6 | 7.8 |
|  | 100.3 | 99.8 | 99.8 | 100.3 |
|  | Loose Bulk Density*, pcf after drying at 230 F. | | | |
| Day after fabrication | 56 | 59 | 60 | — |
| 14 months moist storage before drying | — | 58 | 57 | 50 |

*Equivalent to ASTM C330 and C332 unit weight (loose) per ASTM C29 procedures

The as-fabricated pellet crushing strength was relatively low (less than 0.5 pounds for 6/8 mesh pellets). Half of the sample pellets produced were dried overnight at 230 F. and then were tested for crushing strength. The other half of the resultant pellet samples were placed in a plastic bag and stored wet for a period of 14 months before the crushing strength was measured. The results shown in Table 3 revealed that the strength had increased almost ten-fold compared to the as-fabricated pellet properties. All results in Table 3 are the average of eight to twelve individual crushing tests.

For comparison purposes, crushing strength of 6/8 mesh expanded perlite and shale aggregates was also measured, and is shown in Table 3. The crushing strength of the cement dust pellets subjected to moist storage was intermediate to that of the more conventional materials.

The loose bulk density of the pellets is below the 70 pcf maximum specified for fine aggregate in ASTM C330 and C332, suggesting that this material could be used as lightweight concrete fine aggregate if grading and concrete property requirements are met.

| $SiO_2$ | 15.5 |
| --- | --- |
| $Al_2O_3$ | 3.4 |
| $Fe_2O_3$ | 2.5 |
| CaO (total) | 40.5 |
| MgO | 2.0 |
| $SO_3$ | 6.0 |
| $K_2O$ | 10.5 |
| $Na_2O$ | 0.5 |
| Loss on ignition | 22.5 |
| Free CaO | 4.5 |

Pellets produced in this example had a very narrow size distribution (Table 2) typical of stable pelletizer operation. Pellet strength data shown in Table 3 revealed that the crushing strength of pellets stored 14 months under damp room temperature conditions was significantly increased.

EXAMPLE III

Cement kiln dust from a third source was pelletized in the same shallow pan pelletizer noted in the preceeding examples. However, this dust had the following typical chemical analysis:

| $SiO_2$ | 14.9 |
| --- | --- |
| $Al_2O_3$ | 3.83 |
| $Fe_2O_3$ | 1.67 |
| CaO (total) | 47.2 |
| MgO | 1.88 |
| $SO_3$ | 9.05 |
| $K_2O$ | 4.22 |
| $Na_2O$ | 0.72 |
| Loss on ignition | 15.9 |
| Free CaO | 4.37 |

The operating conditions were adjusted to provide a bed cascading down from the 11 o'clock position, the water spray was introduced at the 6 o'clock position and a water content of 25.5 percent was used. The pelletizer was run for 30 minutes without problems and the pellets produced had a very narrow size distribution (Table 2) both of which are indicative of stable pelletizer operations. Pellet strengths (Table 3) were about

TABLE 3

| AVERAGE CRUSHING STRENGTH (pounds) OF CEMENT KILN DUST/FLY ASH PELLETS COMPARED TO OTHER TYPES OF LIGHT/WEIGHT AGGREGATE | | | | | | | |
| --- | --- | --- | --- | --- | --- | --- | --- |
|  |  |  | Pellet Size, Tyler Mesh | | | | |
|  |  |  | As Produced, | Dried Overnite at 320 F., | Undried Pellets Stored In Plastic Bags for 14 months | | |
| Aggregate Type | Example Number | Percent Water | 6/8 mesh | 6/8 mesh | 6/8 mesh | 4/6 mesh | +4 |
| Cement Kiln Dust #1 | I | 36.3 | — | 1.2 | 4.3 | 5.8 | 11.8 |
| Cement Kiln Dust #2 | II | 23.8 | 0.4 | 1.8 | 6.5 | 9.8 | — |
| Cement Kiln Dust #3 | III | 25.5 | — | 1.5 | 5.8 | 7.9 | — |
| 50 Cement Dust #4 50 Fly Ash* | IV | 35.8 | — | 0.8 | 3.6 | — | — |
| Expanded Perlite | — | — | 2.1 | — | — | — | — |
| Expanded Shale | — | — | 18.9 | — | — | — | — |

*Bituminous

EXAMPLE II

Cement kiln dust from a second source was pelletized in a shallow pan pelletizer using essentially the same procedures described in Example I, except that the water spray and powder feed rates were adjusted to provide a water content of 23.8 percent based on the dry dust weight. This dust had the following typical chemical analysis by weight:

the same as those obtained from the cement kiln dust pelletized in Examples I and II, with the moist stored pellets having the highest strength.

EXAMPLE IV

In this typical example, cement kiln dust and a power plant fly ash were dry blended together in a 50:50 weight ratio before pelletizing. These dusts had the following typical chemical analyses:

|  | Cement Kiln Dust No. 4 | Fly Ash |
| --- | --- | --- |
| $SiO_2$ | 13.9 | 46.5 |
| $Al_2O_3$ | 5.9 | 26.5 |
| $Fe_2O_3$ | 2.4 | 16.0 |
| CaO (total) | 40.6 | 0.9 |
| MgO | 2.2 | .8 |
| $SO_3$ | 10.7 | .6 |
| $K_2O$ | 5.9 | 1.6 |
| $Na_2O$ | 1.1 | 0.4 |
| Loss on ignition | 19.8 | 4.9 |
| Free CaO | 4.9 | N.R. |

The pelletizing parameters were similar to those described in Examples I and II, except that the water and material feed rates were adjusted to obtain a water content of 35.8 weight percent. The resultant pellets had a relatively wide sieve analysis (Table 2) and a lower strength (Table 3) than the 100 percent cement kiln dust pellets. The bulk density of these pellets (Table 2) was well below that required for lightweight concrete aggregates.

Samples of these pellets were tested for crushing strength after various low temperature hydrothermal treatments and the data in Table 4 was collected.

TABLE 4

EFFECT OF HYDROTHERMAL TREATMENTS ON STRENGTH OF CEMENT-KILN-DUST FLY-ASH PELLETS

| Cure Condition | Average Crushing Strength, pounds on 6/8 mesh pellets |
| --- | --- |
| Dried overnite at 230 F. | 0.78 |
| Moist for 13 days at 70 F. (fog room) | 1.47 |
| Moist for 13 days at 140 F. (steam cabinet) | 2.77 |
| Moist for 14 months at 60–80 F. (plastic bag) | 3.59 |

The results indicate that the pellet strength is significantly enhanced by low temperature moist curing, particularly by the 140 F. steam curing.

I claim:

1. The method of forming lightweight concrete which comprises mixing cement, pellets of cement kiln dust which have been subjected to a low thermal treatment at high humidity, and water to form a curable mass, and thereafter curing said mass.

2. The method of forming lightweight concrete which comprises mixing cement, pellets of cement kiln dust and fly ash which have been subjected to a low thermal treatment at high humidity, and water to form a curable mass, and thereafter curing said mass.

* * * * *